United States Patent [19]

Müller

[11] 4,110,643
[45] Aug. 29, 1978

[54] INDUCTION MOTOR

[76] Inventor: Arnold Müller, Lichtensteinstr. 31, 7312 Kirchheim, Teck, Fed. Rep. of Germany

[21] Appl. No.: 717,733

[22] Filed: Aug. 24, 1976

[30] Foreign Application Priority Data

Aug. 29, 1975 [DE] Fed. Rep. of Germany ....... 2538561

[51] Int. Cl.$^2$ ............................................. H02K 9/19
[52] U.S. Cl. ................................. 310/54; 310/125; 310/57; 310/59; 417/368
[58] Field of Search ................. 310/54, 57, 62, 63, 310/112, 114, 125, 124, 126; 417/368

[56] References Cited

U.S. PATENT DOCUMENTS

| | | | |
|---|---|---|---|
| 953,219 | 3/1910 | Muller | 310/125 X |
| 2,657,322 | 10/1953 | Holst | 310/125 X |
| 2,844,101 | 7/1958 | Burns et al. | 310/54 X |
| 2,922,098 | 1/1960 | Hutson | 310/125 X |
| 3,456,141 | 7/1969 | Burgess | 310/58 X |
| 3,749,949 | 7/1973 | Muller | 310/59 |

*Primary Examiner*—Donovan F. Duggan
*Attorney, Agent, or Firm*—William Anthony Drucker

[57] ABSTRACT

Variable-speed electric induction motors are known with a closed fluid-flow circuit for coolant liquid driven by a pump operated by the motor. A disadvantage is that the coolant flow varies with speed of the motor. The improvement is that the motor has an ancillary shaft which drives the coolant pump and which is rotated at constant speed irrespective of the speed of the main drive rotor of the motor. The ancillary shaft may be driven by an ancillary rotor cooperating with the main stator of the motor. There may also be provided a coolant fan driven at constant speed, for example by the ancillary shaft and preferably through a releasable clutch.

6 Claims, 2 Drawing Figures

INDUCTION MOTOR

The present invention relates to an induction motor of the kind in which the interior is completely filled with a cooling fluid, especially with oil, which can be circulated by means of a pump in a hermetically sealed circuit.

BACKGROUND OF THE INVENTION

It is already known, in electromotors for centrifugal, underwater or liquid pumps, and also in large electrical machinery, generators and turbo-generators, to provide cooling systems by means of which the stator and/or the rotor or, alternatively, the whole of the electromotor, can be cooled using liquid or gaseous coolants, such as compressed air, water or oil, and in which liquid coolants can be vaporised, sprayed or atomised, and in which provision can be made for special devices such as cooling grooves, cooling slots, cooling rings, tubular conductors or baffle equipment, in order to achieve an especially good cooling effect on certain components. It is also possible to equip the cooling system with control and distributing devices and with monitoring installations.

It is also known to provide circulation of the cooling fluid or the cooling gas in the cooling circuit by means of a pump which is driven directly from the shaft of the motor. A disadvantage of these known cooling systems is that, because the coolant pump is driven directly from the shaft of the motor, it is not possible to achieve a constant circulation of the cooling fluid with a consequent constant cooling effect, owing to the fact that the degree of cooling rises or falls with the speed of revolution of the motor to be cooled.

In the case of induction motors designed as variable speed motors, it must be possible to change the speed of rotation frequently within wide limits, as a result of which the heat losses in the motor usually undergo a considerable increase as the speed of rotation falls. With variable speed induction motors, the problem therefore arises that, when the coolant pump is driven from the shaft of the motor, the cooling effect drops sharply precisely when a particularly large amount of heat losses have to be dissipated if overheating of the motor is to be avoided.

OBJECT OF THE INVENTION

The object of the invention is to provide an induction motor in which it is ensured that the heat losses occurring are dissipated with certainty under all operating conditions.

SUMMARY OF THE INVENTION

In the case of an induction motor of the kind referred to initially hereinabove, the invention achieves this result in that the induction motor is designed as a conventional variable speed motor and in that the pump can be driven by a shaft rotating at constant speed. In one advantageous embodiment, the variable speed motor has, in conventional manner, an ancillary rotor which can be driven at constant speed and is mounted on an ancillary rotor shaft, the pump being driven by this ancillary rotor shaft. Variable speed motors of this type are, in fact, known (Federal Republic of Germany Patent Specification No. 2,332,868, U.S. Specification No. 3,939,370) and have a main rotor and an intermediate rotor, both located inside a common stator, the intermediate rotor being in the form of a shell or cup and enclosing an ancillary rotor which hitherto has been used to drive a fan. The ancillary or fan rotor is mounted on a hollow shaft which also carries the fan or the fan wheel and which surrounds concentrically the main shaft or the output shaft of the variable speed motor. In accordance with the present invention, on this ancillary rotor shaft, which is in the form of a hollow shaft, there is mounted the pump for the coolant, or the impeller of the pump, which is thereby driven at constant speed and consequently ensures constant circulation of the cooling fluid, even when the speed of rotation of the output shaft of the variable speed motor drops.

In an induction motor constructed in accordance with the invention, the circulating pump is preferably fitted inside one of the bearing brackets or the housing and separated from the interior of the housing by a partition having one or more outlet apertures for the passage of the coolant. The pressure chamber of the circulating pump has an opening in the bearing bracket or housing leading to the outside. One or more connecting openings are provided in the other bearing bracket, i.e. in the bearing bracket on the opposite side of the motor housing, for the return flow of the oil into the interior of the housing.

Outside the housing of the induction motor, the cooling fluid is passed through a heat exchanger which is preferably in the form of a spiral cooling coil and which is connected to the outlet side of the pump and has a return pipe leading to the connecting opening in the other bearing bracket or to the opposite side of the housing. The cooling circuit from the inside of the motor housing to the pump and via the heat exchanger or the spiral cooling coil and the return flow to the other side of the motor are thus permanently closed. The cooling device can be fitted either at the side of or above the bearing bracket or alongside the motor housing, and also for example in the vicinity of cooling fins on the outside of the motor housing. In all these cases, it is desirable to fit a fan which can be driven at constant speed. For this purpose, the fan can either be driven via the ancillary rotor shaft at the same speed as the pump or it can be driven at constant speed by means of a separate drive. In this case, particularly effective cooling of the heat exchanger by the current of air produced by the fan is possible. The fan can be driven from the ancillary rotor shaft via a clutch, especially a magnetic clutch.

As compared with conventional air-cooled induction motors, the present invention has the advantage that cooling with oil and the like brings with it a considerable and demonstrable improvement in performance. The output of the same motor, as compared with a motor with air-cooling, can be increased threefold and more. Furthermore, where the same output is required, the possibility exists of making the motor much smaller and thus lighter and cheaper. The only additional requirement is the provision of a fluid-tight joint between the bearing brackets and other parts of the housing and to ensure that there is a fluid-tight bearing of the output shaft of the motor in at least one bearing bracket. As compared with ordinary variable speed motors, the motor itself hardly requires any modification.

The stator, with the stator winding, is accommodated in conventional manner in the motor housing, in which the main rotor and the output shaft of the rotor rotate. Coolant is supplied to one side of the motor and led off from the other side. In the process, the whole of the inside of the motor is traversed by the coolant, for example oil, which flows especially via the annular slot between the stator and the main rotor and the other rotors. The performance can be still further improved by providing the stator and the rotors with longitudinally drilled holes forming cooling channels running in an axial direction, thereby markedly increasing the cooling effect. The coolant should preferably be an oil, especially a low-acidity oil or a transformer oil, or any other insulating liquid.

As explained above, the heat exchangers can be fitted in the immediate vicinity of the motors. However, it is also possible to locate the heat exchangers elsewhere than in the motors. By this means, it is possible to keep the waste heat given off by the heat exchangers away from the point of operation of the motor. In such a case, it is particularly desirable, especially when several motors constituted in accordance with the invention are in use, to have a fan with separate drive which can simultaneously cool the heat exchangers of several motors, these heat exchangers again being capable of being driven at constant speed.

The above explanations make it clear that, by means of the invention, a solution is found to the problem of providing a simple cooling system, for induction motors, the cost of which is low and which, irrespective of the take-off speed of rotation of the shaft of the motor, ensures uniform cooling, and in which, without any additional cost, the output of the motor can be increased threefold and more as compared with the systems known hitherto, or in which, for the same output, the dimensions and weight can be significantly reduced. This is a marked step forward in terms of existing arrangements.

BRIEF DESCRIPTION OF THE DRAWING

The invention is explained in greater detail below with reference to the accompanying drawing, in which.

DESCRIPTION OF THE PREFERRED EMBODIMENT

Figure 1:
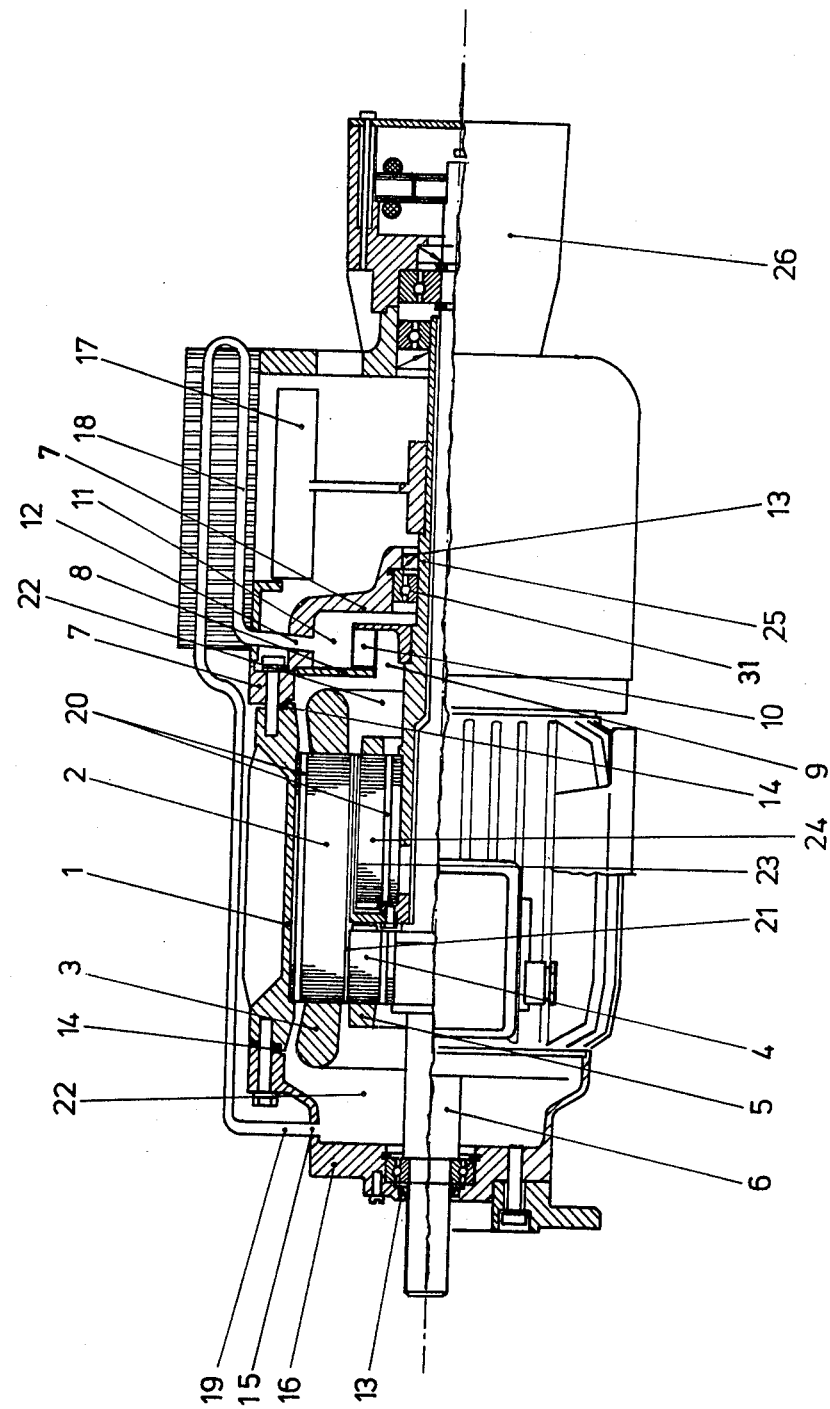
FIG. 1 shows a preferred embodiment of induction motor, in accordance with the invention, seen partly in side view and partly in longitudinal section.
Figure 2:
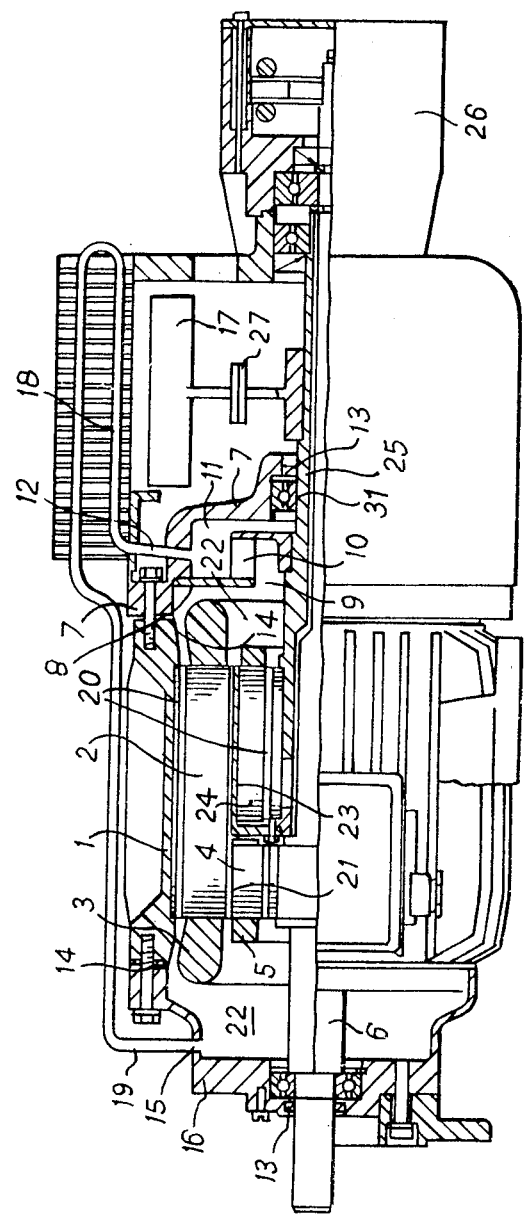
FIG. 2 is a similar view of a modification.

The induction motor shown in FIG. 1 of the drawing has a housing 1 containing a stator 2 with a stator winding 3. A main rotor 4, in the form of a squirrel-cage rotor with a short-circuiting ring 5, which is mounted on the output shaft 6 of the motor, is located inside the stator 2. There is also, inside the stator 2, an intermediate rotor 23 which is connected to the main rotor 4 and rotates concentrically, at the same speed as the latter, within the stator 2. An ancillary rotor 24 is also fitted concentrically to the intermediate rotor 23 and is mounted on a hollow ancillary rotor shaft 25 which surrounds concentrically the output shaft 6 of the motor. The impeller of a circulating pump 10 and a fan 17 are rigidly mounted on the ancillary rotor shaft 25. In the modification shown in FIG. 2, the fan 17 is coupled to the ancillary shaft 25 by a clutch 27, which could be a magnetic clutch, here shown schematically. The speed of rotation of the ancillary rotor shaft 25 and, consequently, the speed of rotation of the circulating pump 10 and of the fan 17 are independent of the speed of rotation of the main rotor 4 and of the output shaft 6 of the motor, and are constant. Bearing brackets 7 and 16 are fitted at the two ends of the housing 1, and the output shaft 6 of the motor is mounted in the two bearing brackets 7 and 16. The ancillary rotor shaft 25 is also mounted in the bearing bracket 7 by means of the bearing 31, in such a way that it can rotate. Longitudinal holes 20 are drilled in the stator 2 and in the main rotor 4 to serve as ducts for the coolant. The whole of the inside 22 of the housing 1 is filled with a cooling fluid, especially with a low-acidity oil.

The bearing bracket 7 is separated from the interior 22 of the housing by a partition 8 which however does not have to be fitted to form a completely fluid-tight joint. One or more openings 9 are provided at a suitable point in the partition 8, to enable the oil to reach the circulating pump 10 without hindrance. The impeller of the circulating pump 10 is rigidly and directly connected to the ancillary shaft 26, so that the oil is forced through the circulating pump 10 into a pump chamber 11, whence it passes through an opening 12 to the outside of the bearing bracket 7.

A heat exchanger in the form of a spiral cooling coil 18 is connected on the outside of the bearing bracket 7 to the opening 12. The spiral cooling coil 18 has several turns of thin-walled tubing inside which the oil circulates. The other end of the spiral cooling coil 18 is connected via a return oil pipe 19 to one or more inlet openings 15 in the opposite bearing bracket 16.

The oil entering in the region of the bearing bracket 16 is forced into the interior 22 of the housing, through the slot 21 between the stator 2 and the main rotor 4, and flows past the intermediate rotor 23 and the ancillary rotor 24 or in between these components. The oil then flows back via the circulating pump 10 to the spiral cooling coil 18 and, after it has been cooled, passes once more through the inlet openings 15 to the inside 22 of the housing.

As may be seen from both figures of the drawing, the fan 17, e.g. a vaned wheel, is located outside the bearing bracket 7 on the output shaft 6 of the motor, and consequently rotates at the same speed as the ancillary rotor shaft 25. The fan 17 can draw in the surrounding air from one or both sides, creating a current of air which flows between the cooling fins on the spiral cooling coil 18, so that the oil flowing therein is cooled. The bearing brackets 7 and 16 are connected by gaskets 14 to the housing 1 to give an oil-tight joint. The sealing of the output shaft 6 of the motor and of the ancillary rotor shaft 25 with respect to the bearing brackets 7, 16 is achieved with the aid of gaskets 13. The gaskets ensure that there can be no loss of oil, so that the motor is always full of oil and is reliably cooled, irrespective of whether the circulating pump 10 is mounted inside the bearing bracket 7 and the fan 17 on the outside thereof, or whether the fan is located apart from the motor with a separate drive.

Generally speaking, separation of the cooling system from the motor has the advantage that energy losses occurring are not released to the surface in the same air space. For this reason, cooling in a separate space has the advantage that the drive units can, without further ado, be installed in fully air-conditioned rooms.

Furthermore, an induction motor in accordance with the invention, that is to say, with a hermetically sealed cooling can, in like manner, be employed for any desired speed of rotation and output, for example for textile machinery, winding machines, plastic machines, machine tools, for crane drives, for packing machines, for pumping installations, for refrigerating units (without contact with agressive coolants), etc., irrespective of whether the speed of rotation is constant or variable down to the slowest speed. A further advantage lies in the fact that the motor can, without any modification, be used with maximum safety where environmental influences of a chemical or explosive nature are present. Instead of the double rotor type described, it is also possible to use, as the variable speed motor, one having only one rotor in the form, for example, of a resistance rotor.

I claim:

1. In a variable-speed electric induction motor, of that kind having a stator and a rotor, and means defining a hermetically sealed liquid flow circuit including internal space of the motor, a coolant liquid in said liquid flow circuit, and a pump located in said liquid flow circuit for pumping said coolant liquid in said liquid flow circuit, the improvement which comprises a free-running ancillary shaft, and drive means independent of the rotor of the motor for rotating said ancillary shaft at constant speed, said pump being coupled for driving to said ancillary shaft.

2. A variable-speed electric induction motor, as claimed in claim 1, wherein said rotating means is an ancillary rotor cooperating with the motor stator and coupled to and driving said ancillary shaft.

3. A variable-speed electric induction motor, as claimed in claim 1, further comprising a fan, and means for driving said fan at constant speed.

4. A variable-speed electric induction motor, as claimed in claim 1, further comprising a fan coupled for driving to said ancillary shaft.

5. A variable-speed electric induction motor, as claimed in claim 1, further comprising a fan, and a clutch providing releasable driving connection between said ancillary shaft and said fan.

6. A variable-speed electric induction motor, as claimed in claim 4, wherein said means defining a hermetically sealed liquid flow circuit includes a heat-exchanger, said heat-exchanger being arranged outside of said internal space of the motor and adjacent said fan such that air flow is provided from the fan through the heat-exchanger for cooling said coolant liquid.

* * * * *